July 20, 1937.　　　　A. AMES, JR., ET AL　　　2,087,234
OPHTHALMIC LENS
Filed May 27, 1935　　　2 Sheets-Sheet 1
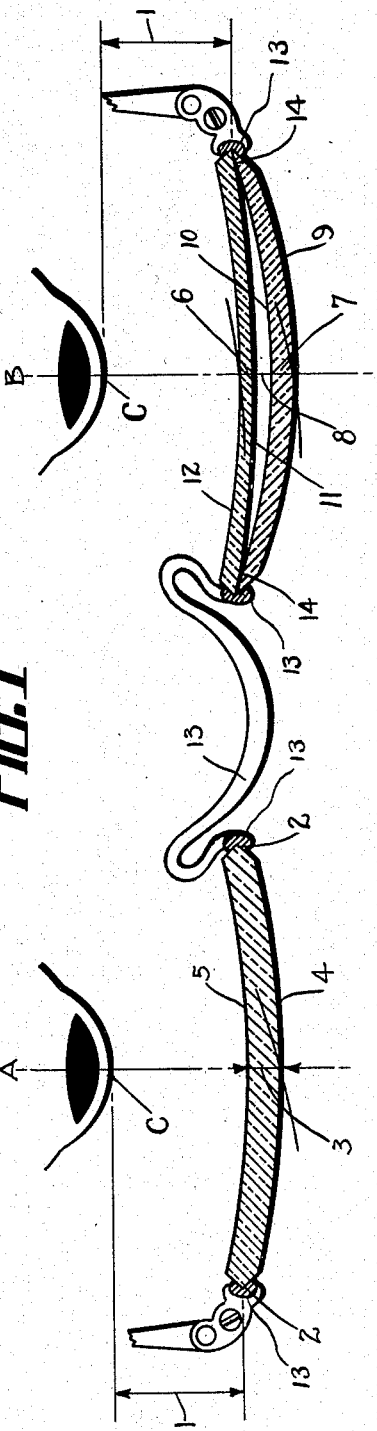
FIG. I
FIG. II
INVENTOR
ADELBERT AMES JR.
GORDON H. GLIDDON
BY
Harry H. Styll.
ATTORNEY July 20, 1937.　　　A. AMES, JR., ET AL　　　2,087,234
OPHTHALMIC LENS
Filed May 27, 1935　　　2 Sheets-Sheet 2
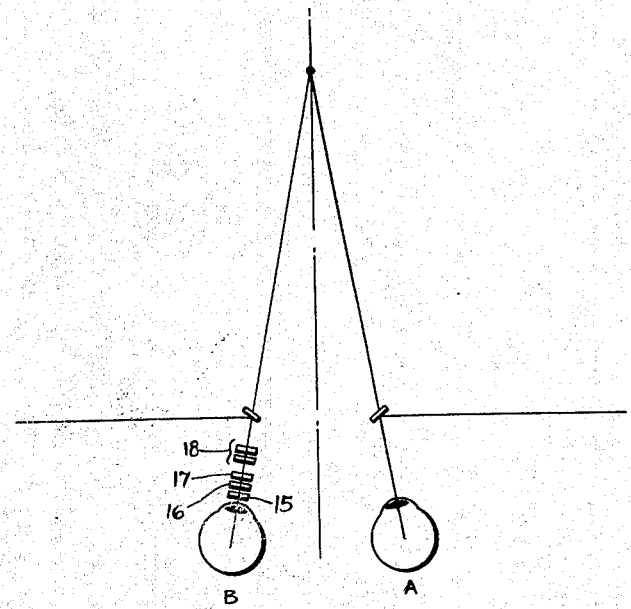
FIG. III
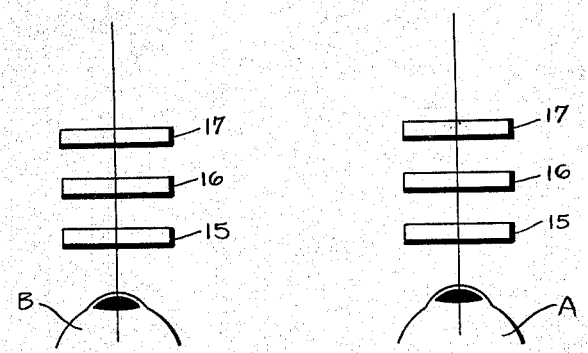
FIG. IV
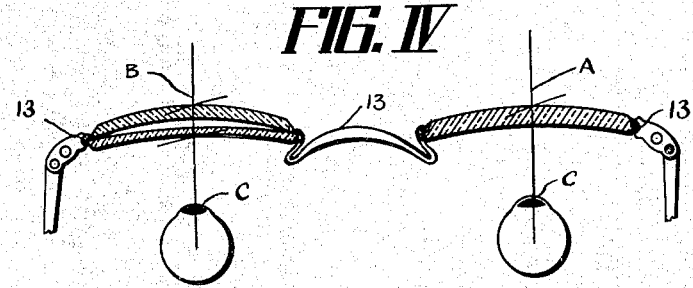
FIG. V
INVENTOR
ADELBERT AMES JR.
GORDON H. GLIDDON
BY
Harry H. Styll
ATTORNEY Patented July 20, 1937

2,087,234

UNITED STATES PATENT OFFICE 2,087,234

OPHTHALMIC LENS

Adelbert Ames, Jr. and Gordon H. Gliddon, Hanover, N. H., assignors to trustees of Dartmouth College, Hanover, N. H., a corporation of New Hampshire Application May 27, 1935, Serial No. 23,695

2 Claims. (Cl. 88—54)

This invention relates to an improvement in lenses for the correction of size variations in the ocular images or actual sight impressions of the eyes either overall or meridional or combined and to a new process for making the same.

As herein used the term "actual visual impression" or "ocular image" describe the impression formed in the higher brain centers through the vision of the eyes. It is determined not only by the properties of the dioptric image that is formed on the retina of the eye, but also by the modifications imposed upon it by the anatomical properties and physiological processes by which this optical image is carried to the higher brain centers.

A principal object of the invention is to provide means for holding lenses for the eyes wherein all forms of magnification of the lens means before the eyes will be so balanced as a composite magnification to equalize the ocular images or actual sight impressions of the eyes without changing the required power of said lens means as required for the corrective prescription for the patient's dioptric or refractive errors.

Another object of the invention is to provide a new and improved process for designing, constructing and mounting such lenses.

Other objects and advantages of the invention will become apparent from the following description taken in conjunction with the accompanying drawings. It will be apparent that many changes in the arrangement of parts, details of construction and order of the steps of the process may be made without departing from the spirit of the invention as set forth in the accompanying claims. It is, therefore, not desired to limit the invention to the exact matters shown and described as a preferred form only has been described by way of illustration.

Referring to the drawings:

Fig. I is a front elevation of a pair of spectacles embodying the invention;

Fig. II is a cross section on line II—II of Fig. I;

Fig. III is a diagrammatic plan view of the test means showing the cells for the trial test lenses;

Fig. IV is a diagrammatic plan view of said cells; and

Fig. V is a plan view of a pair of spectacles embodying the invention, the lenses being shown in cross section and the said lenses being equivalent to the trial test lenses.

These lenses are of the order and for the purposes of the lenses shown and described in United States Patent Number 1,933,578, November 7, 1933, but embody certain modifications thereof and additions thereto, as will be set forth hereinafter.

These lenses embody the entire refraction of the patient, including errors of focus including astigmatism, muscle disturbances, as well as the correction for size variations.

The eyes are refracted for these errors by the processes and instruments described in Patents No. 1,946,925 of February 13, 1934 to Adelbert Ames, Jr.; No. 1,944,871 of January 30, 1934 to Adelbert Ames, Jr. and Gordon H. Gliddon; and co-pending applications Serial Nos. 618,200; 706,523 and 23,694 co-pending application filed on the date of this application.

Until recently the refractive corrections for the eyes were limited to correction for focus, astigmatism and muscle disturbances. Correction for focus was introduced into the lens by spherical lens surfaces, for astigmatism by cylindrical or toric lens surfaces, and for muscle disturbances by a prismatic surface or decentration of the lens, as well known in prior art refractive lenses.

If there were focal and astigmatic errors, a spherical surface was placed on one side and a cylindrical or toric surface on the other, and where phoria or muscle trouble was present also, the lenses were decentered to get the proper amount of prism power, as is well known.

Where variation in ocular image size is added to these prior art errors, a new element is introduced. Size variation is corrected by magnification in conjunction with dioptric power. Now, it is clear that if the other refractive errors aforementioned are corrected, the added magnification must not disturb the power for their correction and on the other hand, the magnification due to power must be taken into account. In other words, a predetermined corrective magnification has to be added without disturbing the dioptric power of the combination.

In considering magnification for equalizing the size variations we must take into account the total magnification of the lenses before both eyes, and arrange it so that the composite result will be to equalize the size variations without changing the power of the lens combinations. Magnification of a lens is a composite of the magnifications due to power, its position before the eye and to its shape, i. e. thicknesses, separations, and surface curvatures. In our present invention we produce our size correction by a consideration and a balancing of all components of the magnification present in the combination.

It is important to bear in mind that the resultant correction in prescription spectacles must be equivalent to the trial correction with an exactness sufficient to accomplish the measured correction.

Magnification may be balanced without power change by placing a no power bent lens before one eye, the required magnification being introduced by the bending or cupping or shape function of the no power lens. The more the no power lens is bent or cupped, the greater the magnification if the concave side is towards the eye. In our present invention, however, we do not place all of the magnification in a single no power cupped lens unit, but distribute it as desired for best results throughout the various elements of the spectacle combination, as we select to give the best results in shape and weight of lenses as will be described hereinafter.

Referring to the drawings:

In the right or A lens (Figs. I and II) the magnification is a function of the distance 1 from the eye, i. e., the distance from the surface of the cornea of the eye to the point 2, which is the bevel point of the lens, the thickness of the lens 3, and the curvature of the surfaces 4 and 5 of the lens.

The magnification of the left or B lens system is a function of the distance 1, as before, from the eye, the thicknesses 6 and 7 of the two units, the separation 8 between the units, and the surfaces 9, 10, 11 and 12 of the two units.

The powers of these two lens systems are of course, as with prior art lenses, approximately the algebraic sum of their surfaces, or in accordance with accepted procedure.

The object of the pair of lens systems shown is to correct the refractive or power errors of the eyes and at the same time to equalize the size variations between them, in order that the patient's vision may be entirely corrected for all these errors.

The invention may, we believe, be best described by taking an actual example of a refractive correction which we have made and fitted.

The following is the reading of the instrumentation of the refractive test for the right or A eye:

Cell No. 1—+0.37 (spherical)
Cell No. 2—−1.00—Axis 180 degrees (cylinder)
Cell No. 3—Empty The reading for the left or B eye is:

Cell No. 1—+0.12
Cell No. 2—−1.25—Axis 5 degrees
0.75% magnification over all combined with 0.75% magnification axis 180 degrees.

The cells referred to are the cells on the test instrument for holding the test lenses at given distances from the eyes.

These cells are shown in Figs. III and IV. No. 1 cell, indicated at 15, is the cell for the spherical lenses. No. 2 cell, indicated by 16, is the cell for the cylinder lenses. Cell No. 3, indicated by 17, is for a removable protractor device or scale for setting the axis of a power cylinder or for extra power lenses. The cells for the size lenses are indicated at 18.

After the eyes have been refracted, the patient's complete correction is placed in the trial lens cells, checked and balanced as diagrammatically indicated in Fig. IV. The actual wearable lenses must be equivalent to the trial combination or correction to a sufficient degree within the threshold values for the respective refractive corrections.

The test thus shows for the right or A eye a plus 0.37 diopter spherical test lens in Cell No. 1 before the eye at a known distance therefrom. Also, this eye has a minus 1.00 diopter cylindrical test lens at axis 180 degrees in Cell No. 2, whose position is known with respect to Cell No. 1. The next cell, No. 3, provided for in the test instrument, is in this case empty.

For the left or B eye, the Cell No. 1 has a plus 0.12 diopter spherical test lens. In Cell No. 2 there is a minus 1.25 diopter cylindrical test lens, axis 5 degrees, and further in front of this is a size altering and determining instrumentality which may be considered as test lenses for producing size variations which would give the equivalent of said size altering and determining instrumentality, i. e., a size reading, giving the overall size and the meridional size corrections as determined with the methods and instruments described in the above mentioned patents and applications. The present correction is an overall size increase for this eye of 0.75 per cent, and a meridional size inrease of 0.75 per cent, axis 180 degrees. This will equalize the ocular image size difference between the two eyes.

When the percentage of size is given as 0.75 per cent, this means that the ocular image of the respective eyes is made larger in the ratio of 1.0075 to 1.0000.

From these readings it is necessary to calculate and design a spectacle lens system to produce the effect of the trial lens correction set, see Figs. III and IV, before the eyes. A number of various designs can be made to produce this effect. The lens systems designed for the above readings are shown in the drawings. The surface dioptral powers are in terms of 1.53 index of refraction ground on 1.523 index glass. The reason for this is that 1.53 index tools are in common use in the art, while the glass actually used in ophthalmic lenses is 1.523 index. This procedure is general in the art.

For the right or A eye, the front surface 4 of the lens is plus 5.50 diopters in the 90 degree meridian and plus 6.50 diopters in the 180 degree meridian. The thickness 3 is 3.00 millimeters. The opposite surface 5, termed the ocular surface, is minus 6.12 diopters ground 0.06 diopters strong in order to give exact focal power required. The lens is center beveled and the center of this bevel, 2, is placed the distance 1, which is 12 millimeters from the cornea C.

For the left or B eye, the front curve 9 in the 5 degree meridian is plus 10.50 diopters. In the 95 degree meridian it is plus 11.25 diopters. The thickness 7 is 2.00 millimeters.

The second surface 10 from the front has a curvature of minus 9.00 diopters. There follows an air space 8, which is determined by the third surface 11 contacting with the second surface 10 at a 40 millimeter diameter. The power of this surface 11 is plus 4.37 diopters. The thickness 6 between surfaces 11 and 12 is 1.00 millimeter, and the fourth or ocular surface 12 has a power of minus 6.00 diopters in the 5 degree meridian and minus 8.00 diopters in the 95 degree meridian.

The units are mounted in a frame 13 so that the edges 2 of the bevels come at 12.00 millimeters from the cornea C. The frame 13 is made of bendable material so that it may be bent to adjust the lenses to the required distance from the cornea C.

Any curved lens of finite dimensions produces magnification because of its position before the eye, its shape, and its power. Unavoidably, the right lens A must have some magnification, but we have required that the overall magnification ratio between the left eye and right eye shall be 1.0075 and that in the 180 degree meridian there is an additional meridional magnification also of the ratio 1.0075 between these eyes; in other words, the magnification in the 90 degree meridian of the left eye is .75 per cent greater than in the same meridian of the right eye, and in the 180 degree meridian of the left eye it is .75 per cent plus .75 per cent, or approximately 1.5 per cent greater than in the 180 degree meridian of the right eye. This is the measured size difference between the eyes to be corrected whereby the magnification due to the power correction trial lenses must be considered, as will be discussed hereinafter.

It is evident from the foregoing that an equal change of magnification of the ocular images does, within a certain range, not change appreciably the magnification ratio between them. In the present case the image of the left eye has to be enlarged in order to obtain equality of ocular image size and shape.

The magnification for the right eye A is a function of the following elements, distance 1 from the eye, the thickness 3 of the lens, and the surface curvatures 4 and 5.

The lens A, it will be noted, will probably be of a different form and shape from the test lenses of the trial correction in the cells. Its magnification, therefore, will be different fom the magnification of the trial correction in the A side. This must be kept in mind and provided for as described later.

Taking the magnification of the right eye as given, the determination of the correct spectacle lens for the left eye is more complicated since its magnification depends on the given magnification ratio and on the following elements: distance 1 from the eye, the thicknesses 6 and 7, the separation 8, and the surface curvatures 9, 10, 11 and 12.

Increase of the separation 8 increases the magnification, increasing the thicknesses 6 and 7 increases the magnification, increasing the distance 1 from the eye increases the magnification in the 5 degree meridian very slightly, because the power in that meridian is small, but this increase of distance in the 95 degree meridian decreases the magnification because the power in that meridian is negative.

Increasing the concavity of the units towards the eye, keeping the thicknesses, separations, positions, and power the same, increases the magnification.

It will be noted that we have contacted the two units in the left eye B at the marginal points 14. This gives about half a millimeter bearing surface around the edge of the lens. This permits mounting of the lens in a single rim, and reduces the thickness of the lens system and its weight.

With reference to the positions of the cells and the test lenses before the eyes in testing, these are placed, as has been previously stated, at known distances in front of the eyes and the effect of their own magnification is computed and added to the extra magnification required.

As pointed out above, the total magnification ratios of trial correction and spectacle correction must be equivalent, so that the magnifications due to dioptric power must be compensated to fulfill this requirement. So the magnification of the two eyes of the trial correction and that of the two eyes of the actual wearable lenses must be kept in mind and compensated to the prescriptive requirements. The magnification of each of the actual wearable lenses may be different from that of the corresponding trial correction lenses, because their form is different, but the magnification ratio between the eyes must be maintained in each meridian and must be substantially the same as that of the trial correction lenses.

The distance of the lenses from the eye is important, hence, the actual wearable lenses must be placed at a fixed distance from the eye. If this distance is different from that of the trial correction lenses, the difference must be compensated for.

From the above it will be seen that in designing the lenses of the drawings we have taken into account all of the elements affecting magnification and have balanced the magnifications of the two lens systems, one for each eye, so that there will be enough additional magnification before the left eye B to equalize the size of image of the two eyes and make the actual wearable lenses for practicable purposes the equivalent of the trial correction. The magnifications of both lenses and of the test lenses have been taken into account and the whole spectacle system balanced as required to obtain the desired equalization.

It will be noted that neither unit of the left lens B has parallel or concentric surfaces. The magnification has been distributed through the various elements of the lens, as has been described above. All of the magnification elements discussed above may enter into the composite result.

In designing our lens systems for specified corrective magnifications, we work graphically. We may follow conventional trial and error methods utilizing well known ray tracing procedures. It is also feasible, and for practicable commercial purposes preferable to prepare graphical representations of magnification.

Magnifications and powers of given lenses of given thicknesses, separations and position in relation to the eye may be computed by known prior art methods of lens calculations. By plotting a great number of known lenses of various shapes, thicknesses, positions and separations it is possible to select lens units of desired powers and magnifications and thus to obtain the surface curvatures, positions before the eye, thicknesses and separations, from which data the lenses may be designed and produced by those skilled in the art of lens designing and manufacture.

In general, the lenses are designed by first keeping in mind the best lens systems obtainable for the requirements as regards appearance, neither too flat nor too bulged, and the weight as affected by the thicknesses. This is largely taken care of by only selecting desirable lens forms from the many possible ones producing approximately similar optical effects. With this in mind and from our experience in lenses, we are enabled to select a desirable form of lens having the qualities desired. When the lenses are selected the lens systems are re-checked by calculations and the necessary adjustments made to insure accuracy in filling the prescription.

The material and tools are selected, as stated above, and the lens surfaces ground, the lenses being finished to the required size and thicknesses. The lenses are then edged to size and beveled to bring the points of the bevels 2 and 14 at the required distance from the eye. In the case of the units for lens B, the surfaces 10 and 11 are marginally finished for a marginal contact at 14 and the units cemented or otherwise secured together. The lenses are fitted in the frame 13 which is adjusted by bending as is usual with frames to bring the points 2 and 14 the calculated distances from the eye. The frames with the lenses are carefully fitted to the face so that the lenses will remain at the proper distance from the eyes.

From the foregoing it will be seen that the finished spectacle will have lenses that not only correct the refractive errors of focus including astigmatism and muscle disturbances, but will also equalize the ocular images of the eyes, all of the elements of the lenses having been balanced to give a composite correction of the patient's vision for practical purposes equivalent to his trial correction. The extra magnification required to equalize the size impressions has been introduced without changing the powers of the lenses. In this spectacle all the elements of magnification have been taken into account, the magnification of the test lenses, the magnification of the lens A, the magnification as affected by position, thicknesses, separations, power and shape—all have been balanced and made up of lenses that may be mounted like single lenses in a single rim.

The steps in the production of these lenses are: a careful refraction for power as well as size errors, the listing of known lens units in the practical range, selection of the lens units, the grinding of the lens units to the selected curvatures and thicknesses, the checking of the lenses for substantial equivalency with the trial lenses, the mounting of the lens units at the required distance from the eyes, with the required separation of units and the adjustment of the mounting to position and retain the lenses at the proper distance from the eyes.

The important thing to keep constantly in mind is that a power correction will introduce some magnification, and that a magnification correction may introduce power. This must be checked at each stage and corrected. The final test correction must balance all the power and size errors, and the actual wearable lenses must have the same effect as the test correction lenses with the magnification in the same ratio as in the test correction set.

In summation, some of the principal characteristics of our lenses are:

The wearable lenses have for practicable purposes the effect of the trial correction both in power and magnification.

The wearable lenses may have different magnifications from the trial correction, but the ratio of magnification must be the same in corresponding meridians.

The magnifications of the lenses result from the magnification effects of all the characteristics controlling magnification as distance from the eye, thickness of units, separations of units, and curvatures of surfaces.

Magnification without power is mainly introduced by the cupping or concaving of the lens units.

The distance from the eyes must be the required distance, if not there will be a change of magnification. The distance from the eyes of the wearable lenses must be the same as for the trial correction lenses or compensation be made.

The required thicknesses and separations must be used and maintained.

Power changes introduce changes of magnification and magnification changes may introduce power changes. They must be balanced.

A no power lens which has no power at one specified distance will have power at all other distances.

Any form of lens has magnification due to power, form (its shape) and distance from eye, thickness and separation of parts. The ratio of the magnifications for the two eyes in corresponding meridians has to be that of the trial correction lenses.

The lenses are cupped or concaved in shape to introduce change of magnification without change of power. This enables units of less separation to be used, cutting down bulk and making the lenses more presentable for use before the eyes.

Contacting the units also reduces the thickness or bulk of the lens system, thus aiding appearance.

The total magnification is balanced to equalize the size impressions of the eyes.

Having described our invention, we claim:

1. The method of making a pair of lens systems to correct the power and image size difference errors of the two eyes comprising testing each eye for its respective power error and for the image size difference ratio between the two eyes, making a lens system for one eye with the required tested power for said eye by forming surface curvatures of calculated radii on the surfaces of lens medium of a given index of refraction to obtain the finished power desired with the thickness of the finished lens lying within the usual optical lens thickness tolerances and with its surface curvatures such that its shape will be desirable from the standpoint of lens design and appearance, determining the total effect of such a lens system on the size of image received therethrough by the eye by taking into consideration the effect of the surface shape, thickness, and distance of the lens from the eye, and making a lens system for the other eye by forming optical surfaces of calculated radii on lens medium of a given index of refraction and reducing said lens medium to a given thickness for a given distance from the eye to obtain an image size change effect with the desired focal power correction for said eye equal to the determined image size change effect introduced by the lens system for the other eye plus an image size change equal to the said ratio of image size difference between the two eyes as determined by the test.

2. A pair of lens systems to correct the power and size errors of the two eyes comprising a lens system for one eye formed of lens medium of a given index of refraction having surface curvatures of calculated radii on the surfaces thereof and a thickness lying within the usual optical lens thickness tolerances and adapted to be positioned at a given distance from the eye to obtain the finished power desired with the surface curvatures such that their shape will be desirable from the standpoint of lens design and appearance and having an inherent image magnification effect dependent on said shape, lens thickness, and distance from the eye, and a lens system for the other eye comprising lens medium of a given index of refraction having optical surfaces of calculated radii on the surfaces thereof and a controlled thickness for a given distance from the eye to obtain an image size change effect with the desired focal power correction for said eye equal to the magnification effect of the first lens system plus a magnification effect equal to the ratio of image size difference between the two eyes.

ADELBERT AMES, Jr.
GORDON H. GLIDDON.